United States Patent
Szymberski

(10) Patent No.: US 8,617,670 B2
(45) Date of Patent: Dec. 31, 2013

(54) EMBLEM ASSEMBLY AND METHOD OF FORMING SAME

(75) Inventor: Michael A. Szymberski, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/890,798

(22) Filed: Sep. 27, 2010

(65) Prior Publication Data

US 2012/0076958 A1    Mar. 29, 2012

(51) Int. Cl.
*A47G 1/12* (2006.01)
*B29C 39/10* (2006.01)

(52) U.S. Cl.
USPC .............. 428/13; 428/67; 428/187; 428/221; 428/542.2; 264/1.7; 264/132; 264/135; 264/246; 264/247; 264/251; 264/263; 264/268; 264/274

(58) Field of Classification Search
USPC ............ 428/13, 67, 187, 542.2, 221; 264/1.7, 264/132, 135, 246, 247, 251, 263, 268, 274
See application file for complete search history.

(56) References Cited

U.S. PATENT DOCUMENTS

| | | | |
|---|---|---|---|
| 4,076,789 A | | 2/1978 | Geller et al. |
| 4,130,623 A | | 12/1978 | Walter |
| 4,292,827 A | * | 10/1981 | Waugh .............................. 72/46 |
| 4,481,160 A | * | 11/1984 | Bree ............................ 264/135 |
| 4,556,588 A | * | 12/1985 | Rockwood ...................... 428/13 |
| 4,769,100 A | | 9/1988 | Short et al. |
| 4,824,506 A | | 4/1989 | Hoerner et al. |
| 4,826,713 A | * | 5/1989 | Cook ................................ 428/31 |
| 4,828,637 A | | 5/1989 | Mentzer et al. |
| 4,838,973 A | | 6/1989 | Mentzer et al. |
| 4,856,857 A | * | 8/1989 | Takeuchi et al. .................. 359/3 |
| 4,868,030 A | | 9/1989 | Mentzer et al. |
| 4,957,802 A | | 9/1990 | Mentzer et al. |

(Continued)

FOREIGN PATENT DOCUMENTS

| | | |
|---|---|---|
| DE | 9321214 U1 | 9/1996 |
| DE | 102007041347 A1 | 3/2009 |

(Continued)

OTHER PUBLICATIONS

U.S. Appl. No. 13/343,763, filed Jan. 5, 2012, Catherine A. Ostrander, Kitty L. Gong, Charles K. Buehler, Chris A. Oberlitner.

(Continued)

*Primary Examiner* — Cathy Lam
(74) *Attorney, Agent, or Firm* — Quinn Law Group, PLLC

(57) ABSTRACT

An emblem assembly configured for attachment to a vehicle includes a first element configured for attachment to the vehicle and a second element configured for attachment to the first element. The first element has a first surface and a second surface recessed from the first surface. The second element has a third surface, a fourth surface spaced apart from the third surface, and a fifth surface extending between the third and fourth surfaces. The emblem assembly further includes a coating disposed on the third surface, and a molded resin disposed adjacent and in fixed contact with each of the fifth surface and the coating to contiguously encapsulate the coating and at least a portion of the fifth surface, wherein the molded resin is bondable to the first element. A method of forming the emblem assembly is also disclosed herein.

20 Claims, 4 Drawing Sheets

(56) References Cited

U.S. PATENT DOCUMENTS

| | | | |
|---|---|---|---|
| 4,960,558 A | 10/1990 | Short | |
| 4,976,896 A | 12/1990 | Short et al. | |
| 5,021,278 A | 6/1991 | Short | |
| 5,433,980 A * | 7/1995 | Auld et al. | 428/13 |
| 5,480,688 A * | 1/1996 | Kaumeyer | 428/13 |
| 5,698,276 A * | 12/1997 | Mirabitur | 428/31 |
| 5,795,527 A * | 8/1998 | Nakamura et al. | 264/267 |
| 5,933,867 A * | 8/1999 | Corder | 2/160 |
| 6,071,621 A * | 6/2000 | Falaas et al. | 428/425.8 |
| 6,372,341 B1 * | 4/2002 | Jung et al. | 428/354 |
| 6,579,397 B1 | 6/2003 | Spain et al. | |
| 6,641,921 B2 * | 11/2003 | Falaas et al. | 428/425.8 |
| 6,646,022 B2 * | 11/2003 | Okazaki et al. | 522/153 |
| 6,682,805 B1 | 1/2004 | Lilly | |
| 6,818,305 B2 * | 11/2004 | Murar et al. | 428/412 |
| 6,835,348 B2 | 12/2004 | Hirosue et al. | |
| 6,863,854 B2 | 3/2005 | Lilly | |
| 7,390,454 B2 | 6/2008 | Ostrander et al. | |
| 7,645,416 B2 | 1/2010 | Buehler et al. | |
| 2002/0032250 A1 | 3/2002 | Okazaki et al. | |
| 2003/0008134 A1 | 1/2003 | Murar et al. | |

FOREIGN PATENT DOCUMENTS

| | | |
|---|---|---|
| EP | 0060721 A1 | 9/1982 |
| EP | 0942820 A1 | 9/1999 |
| WO | 9908870 A1 | 2/1999 |

OTHER PUBLICATIONS

U.S. Appl. No. 13/303,729, filed Nov. 23, 2011, Catherine A. Ostrander, Kitty L. Gong, Charles K. Buehler, Chris A. Oberlitner.

U.S. Appl. No. 13/361,173, filed Jan. 30, 2012, Catherine A. Ostrander, Joel Colombo, Mary K. Gusie, Kitty L. Gong, Charles K. Buehler, Michael P. Balogh.

* cited by examiner

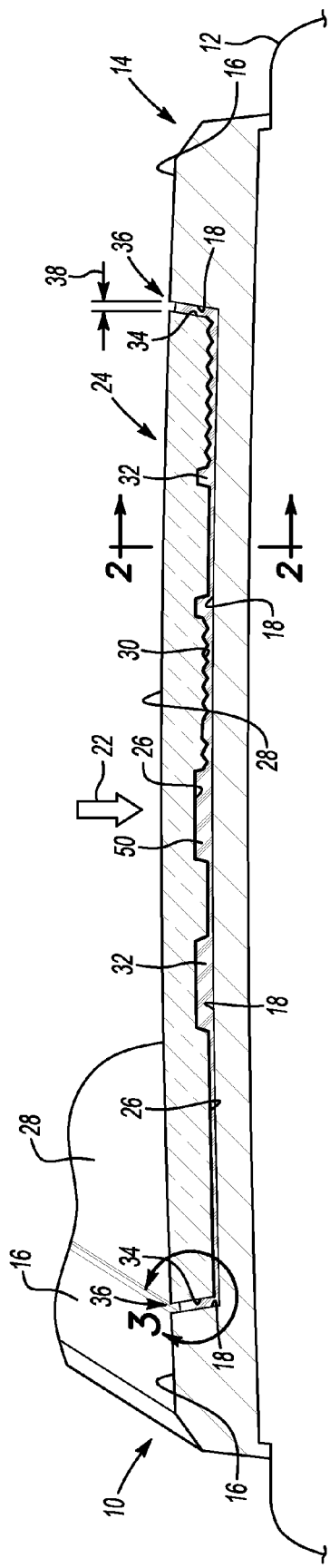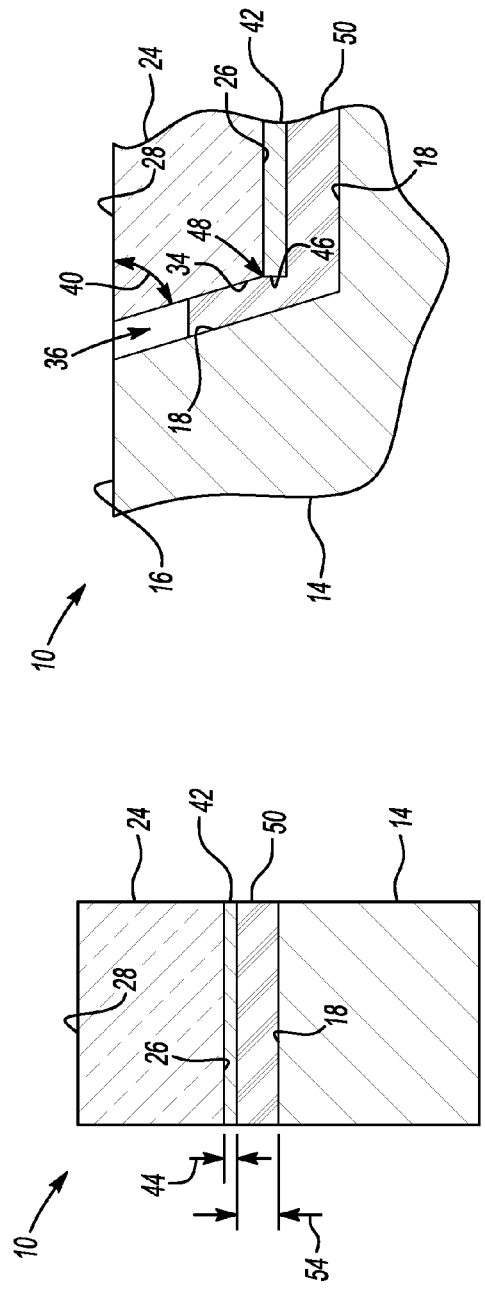

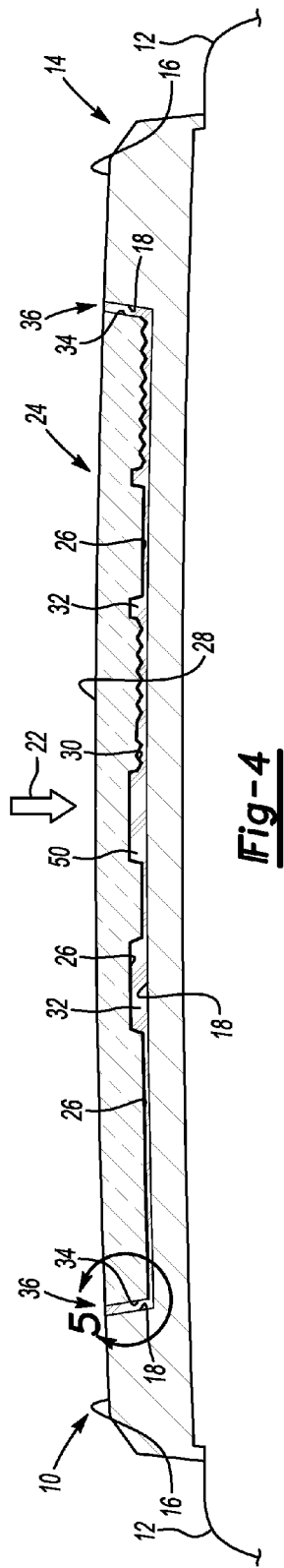
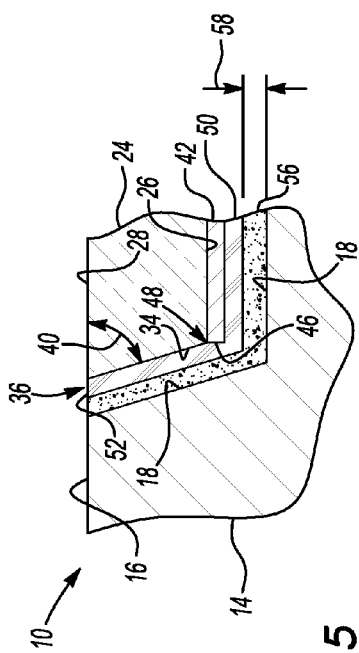

EMBLEM ASSEMBLY AND METHOD OF FORMING SAME

TECHNICAL FIELD

The present disclosure generally relates to emblem assemblies configured for attachment to a vehicle.

BACKGROUND

Vehicles often include distinctive badging, such as emblems, to denote a brand and/or manufacturer of the vehicle. Such emblems are generally designed to convey a positive and easily-recognizable association between the vehicle and the manufacturer of the vehicle, and are therefore often attached to visible exterior and interior surfaces of the vehicle, e.g., front grilles, rear liftgates and trunks, wheel covers, and/or steering wheels. Any defect or degradation of the emblem may diminish the perceived quality of the vehicle and/or tarnish the reputation of the vehicle manufacturer.

SUMMARY

An emblem assembly configured for attachment to a vehicle includes a first element and a second element. The first element is configured for attachment to the vehicle and has a first surface and a second surface recessed from the first surface. The second element is configured for attachment to the first element and has a third surface, a fourth surface spaced apart from the third surface, and a fifth surface extending between the third surface and the fourth surface. The emblem assembly further includes a coating disposed on the third surface, and a molded resin disposed adjacent and in fixed contact with each of the fifth surface and the coating so as to contiguously encapsulate the coating and at least a portion of the fifth surface, wherein the molded resin is bondable to the first element.

In one variation, the coating includes vacuum metalized aluminum and is substantially free from degradation. Further, the emblem assembly includes a transparent second element. In addition, the fifth surface abuts the third surface to form a corner and the fifth surface is spaced apart from the second surface to define a channel therebetween. The molded resin is disposed adjacent and in fixed contact with each of the fifth surface and the coating so as to contiguously encapsulate the coating and at least a portion of the fifth surface to thereby wrap around the corner and fill at least a portion of the channel. The emblem assembly further includes an adhesive sandwiched between and disposed in contact with each of the molded resin and the second surface to thereby bond the second element to the first element.

A method of forming the emblem assembly includes depositing the coating on the second element, whereby the coating is disposed on the third surface. After depositing, the method includes forming the molded resin onto the second element whereby the molded resin is disposed adjacent and in fixed contact with each of the fifth surface and the coating so as to contiguously encapsulate the coating and at least a portion of the fifth surface. After forming, the molded resin is bonded to the first element to thereby form the emblem assembly.

The emblem assembly, and more specifically, the coating of the emblem assembly, exhibits minimized degradation over an operating life of a vehicle. For example, the coating is substantially free from corrosion after prolonged exposure to cleaning solutions and vehicle operating environments. In particular, the molded resin sufficiently seals the channel of the emblem assembly to prevent ingress of fluids and/or contaminants to thereby minimize contact between such fluids and/or contaminants and the coating. Further, the method allows for economical and efficient formation of the emblem assembly, and the emblem assembly contributes to an increased perceived quality of the vehicle.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 1 is a schematic cross-sectional view of an emblem assembly having a planar configuration and including a first element and a second element;

FIG. 2 is a schematic cross-sectional view of the emblem assembly of FIG. 1 along section line 2-2;

FIG. 3 is a schematic cross-sectional view of a portion of the emblem assembly of FIG. 1; and FIG. 4 is a schematic cross-sectional view of a portion of another embodiment of the emblem assembly of FIG. 1;

FIG. 5 is a schematic cross-sectional view of a portion of yet another embodiment of the emblem assembly of FIGS. 1 and 4;

DETAILED DESCRIPTION

Figure 6:
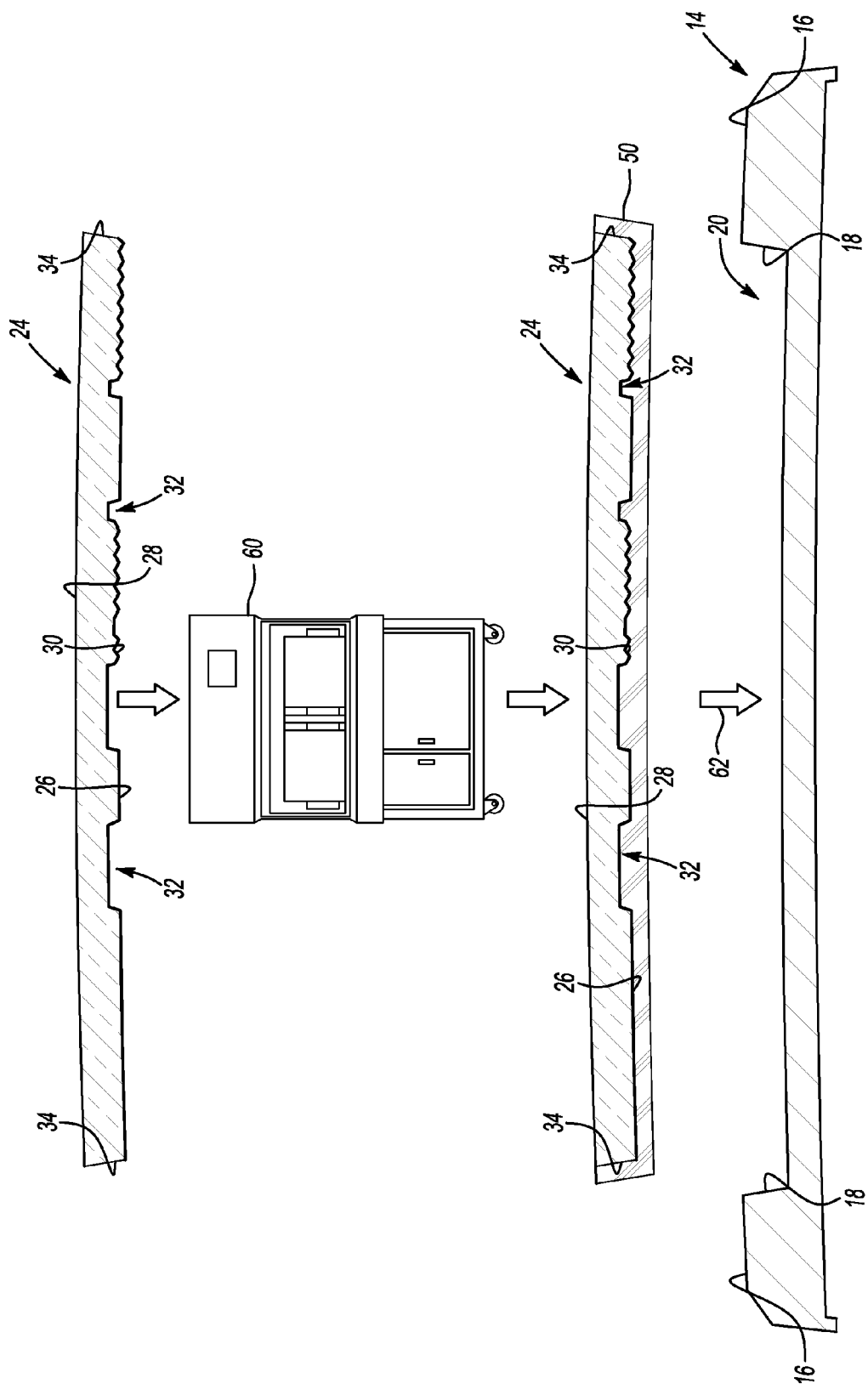
FIG. 6 is a schematic illustration of a method of forming the emblem assemblies of FIGS. 1, 4, and 5.

Referring to the Figures, wherein like reference numerals refer to like elements, an emblem assembly is shown generally at 10 in FIG. 1. The emblem assembly 10 is configured for attachment to a vehicle 12, such as an automotive vehicle. However, the emblem assembly 10 may also be useful for non-automotive vehicles such as, but not limited to, construction, rail, aviation, and marine vehicles.

Referring again to FIG. 1, the emblem assembly 10 includes a first element 14 configured for attachment to the vehicle 12. For example, the first element 14 may be a carrier or bezel and may be configured for attachment to any location or component (not shown) of the vehicle 12, such as, but not limited to, a front grille, rear liftgate, trunk lid, wheel cover, side panel, trim panel, and/or steering wheel. The first element 14 may be attached to the vehicle 12 via any suitable method or attachment device, e.g., screws, tape, or a snap-fit. Therefore, the first element 14 may be formed from any suitable material and selected according to an expected operating environment of the vehicle 12. By way of non-limiting examples, the first element 14 may be formed from metal, plastic, and combinations thereof. In addition, the first element 14 may be coated for aesthetics and/or protection. For example, the first element 14 may be formed from chrome-plated plastic, such as acrylonitrile butadiene styrene (ABS).

With continued reference to FIG. 1, the first element 14 has a first surface 16 and a second surface 18 recessed from the first surface 16. That is, the second surface 18 may extend from the first surface 16 and define a recession or cavity 20 (FIG. 6) within the first element 14. In one example shown in FIG. 1, the second surface 18 may be substantially U-shaped. During vehicle operation, a portion of the first surface 16 may be visible to a potential occupant or operator of the vehicle 12 when viewed from a direction of arrow 22 (FIG. 1). In contrast, the second surface 18 may be substantially hidden by another component of the emblem assembly 10, as set forth in more detail below.

The emblem assembly 10 also includes a second element 24, as shown in FIG. 1. The second element 24 is configured for attachment to the first element 14 and may be generally sized and shaped to fit within the cavity 20 (FIG. 6) defined by the second surface 18 of the first element 14. For example, the second element 24 may be a lens configured for attachment to the aforementioned bezel, i.e., the first element 14. Further, comparatively more of the second element 24 may be visible to a potential occupant or operator of the vehicle 12 than the first element 14 when viewed from the direction of arrow 22. Therefore, the second element 24 may have a shape easily-recognizable as associated with a specific vehicle brand and/or manufacturer. For example, the second element 24 may have a square shape, a bowtie shape, a pointed shape, and/or may include a circular crest shape or a combination of letters. In addition, the second element 24 may have a shape that is the same or different than the shape of the first element 14.

Referring again to FIG. 1, the second element 24 has a third surface 26 and a fourth surface 28 spaced apart from the third surface 26. The third surface 26 may define a plurality of grooves 30 and/or voids 32 configured for reducing a weight of the second element 24 and/or enhancing attachment between the first element 14 and the second element 24. In general, the third surface 26 may be hidden from view upon attachment of the emblem assembly 10 to the vehicle 12 when viewed from a direction of arrow 22. In contrast, the fourth surface 28 may be visible to a potential occupant or operator of the vehicle 12 upon attachment of the emblem assembly 10 to the vehicle 12 when viewed from the direction of arrow 22.

Referring again to FIG. 1, the second element 24 also has a fifth surface 34 extending between the third surface 26 and the fourth surface 28. In one variation, the fifth surface 34 is spaced apart from the second surface 18 to define a channel 36 therebetween. That is, when the second element 24 is attached to the first element 14, as set forth in more detail below, the second surface 18 is disposed adjacent the fifth surface 34, and the channel 36 is defined therebetween. The channel 36 may have a width 38 of from about 0.3 mm to about 0.7 mm, e.g., about 0.5 mm, so as to define a minimal gap between the first element 14 and the second element 24. As such, the fifth surface 34 may also be substantially hidden from a vehicle occupant or operator when the first element 14 is attached to the second element 24.

As shown in FIG. 3, the fifth surface 34 and at least one of the third surface 26 and the fourth surface 28 may define an angle 40 therebetween of less than or equal to 90°. That is, a portion of the second element 24 may be tapered. Alternatively, although not shown, the third surface 26 and the fourth surface 28 may be substantially perpendicular to the fifth surface 34.

The second element 24 may be formed from any suitable material. For example, the second element 24 may be formed from plastic, such as acrylic, metal, such as aluminum, and combinations thereof. In addition, the second element 24 may be translucent, and may be tinted to a specific color, e.g., gold or red. In one variation, the second element 24 is transparent.

Referring now to FIG. 2, the emblem assembly 10 of FIG. 1 also includes a coating 42 disposed on the third surface 26. It is to be appreciated that for purposes of illustration, the coating 42 is not visible in FIG. 1. However, the coating 42 is disposed on the third surface 26 of FIG. 1, as best shown in FIGS. 2 and 3. The coating 42 may be a layer capable of imparting enhanced aesthetics to the second element 24 and the emblem assembly 10. For example, the coating 42 may include aluminum to impart a sheen or metallic appearance to the second element 24.

The coating 42 may be deposited on the third surface 26 via any suitable process. More specifically, in one embodiment, the coating 42 may be a vacuum metalized coating. That is, the coating 42 may be deposited onto the third surface 26 of the second element 24 via vacuum metallization. As used herein, the terminology "vacuum metallization" refers to a physical vapor deposition process capable of depositing a thin aluminum layer, i.e., the coating 42, onto a plastic component, e.g., the second element 24. The coating 42 may have a thickness 44 (FIG. 2) of from about 0.01 µm to about 0.2 µm. Further, the thickness 44 of the coating 42 may not substantially vary along the third surface 26, and the coating 42 may be disposed along the entire third surface 26, e.g., along any grooves 30 (FIG. 1) and/or voids 32 (FIG. 1) defined by the third surface 26.

Additionally, for the variation including the transparent second element 24, the coating 42 may be visible through the fourth surface 28 when viewed from the direction of arrow 22 (FIG. 1). Therefore, to maximize the perceived quality of the vehicle 12, the coating 42 may be substantially free from degradation, such as, but not limited to, corrosion, delamination, chipping, tears, uneven thickness 44, uneven sheen or gloss, and combinations thereof.

As best shown in FIG. 3, the coating 42 may not extend along the fifth surface 34. That is, the coating 42 may have a boundary 46 that terminates at an intersection of the third surface 26 and the fifth surface 34. In one variation, as shown in FIG. 3, the fifth surface 34 abuts the third surface 26 to form a corner 48. Therefore, the coating 42 may be disposed solely along the third surface 26 so as not to wrap around the corner 48 (FIG. 3) of the second element 24.

Referring again to FIGS. 1 and 2, the emblem assembly 10 further includes a molded resin 50 disposed adjacent and in fixed contact with each of the fifth surface 34 and the coating 42 (FIG. 2) so as to contiguously encapsulate the coating 42 and at least a portion of the fifth surface 34. More specifically, the molded resin 50 may abut the second surface 18 and wrap around the corner 48 (FIG. 3) of the second element 24 to thereby act as a barrier to environmental contaminants and/or fluids. Therefore, as best shown in FIG. 3, the molded resin 50 also contacts the coating 42, e.g., at the boundary 46 of the coating 42, and fills at least a portion of the channel 36. Stated differently, the molded resin 50 may encapsulate or envelop the coating 42 and at least a portion of the fifth surface 34 from the environment exterior to the vehicle 12. In this variation, therefore, the molded resin 50 may not be visible when viewed from a direction of arrow 22 in FIG. 1.

Alternatively, as shown in FIGS. 4 and 5, the molded resin 50 may substantially fill the channel 36. That is, the molded resin 50 may have an edge 52 (FIG. 5) that is substantially flush with the fourth surface 28. Therefore, in this variation, the molded resin 50 may be visible when viewed from a direction of arrow 22 in FIG. 1.

As shown in FIGS. 2 and 6 and as set forth above, the molded resin 50 is disposed in fixed contact with each of the fifth surface 34 and the coating 42 (FIG. 2). That is, the molded resin 50 is molded in place onto each of the fifth surface 34 and the coating 42 so as to contiguously encapsulate the coating 42 and at least a portion of the fifth surface 34. As such, the molded resin 50 is not re-positionable, but is rather disposed in fixed contact with each of the fifth surface 34 and the coating 42. In one example, the molded resin 50 may be low-pressure molded onto the second element 24 so as to wrap around the corner 48 (FIG. 3) to thereby contact each of the coating 42 and the fifth surface 34. That is, the molded resin 50 is disposed adjacent and in fixed contact with each of the fifth surface 34 and the coating 42 to thereby wrap around the corner 48 and fill at least a portion of the channel 36.

Referring again to FIGS. 1 and 2, the molded resin 50 is bondable to the first element 14. For example, as shown in FIG. 2, the molded resin 50 may adhere the second surface 18 to the coating 42 so that the second element 24 is attached to the first element 14. The molded resin 50 may be impermeable to environmental contaminants, e.g., dirt, rain, snow, and cleaning agents encountered during operation of the vehicle 12. The molded resin 50 may have a thickness 54 (FIG. 2) of from about 0.2 mm to about 0.8 mm. For example, the molded resin 50 may have a thickness 54 of about 0.5 mm so as to contact and contiguously encapsulate each of the coating 42 and at least a portion of the fifth surface 34.

Figure 7:
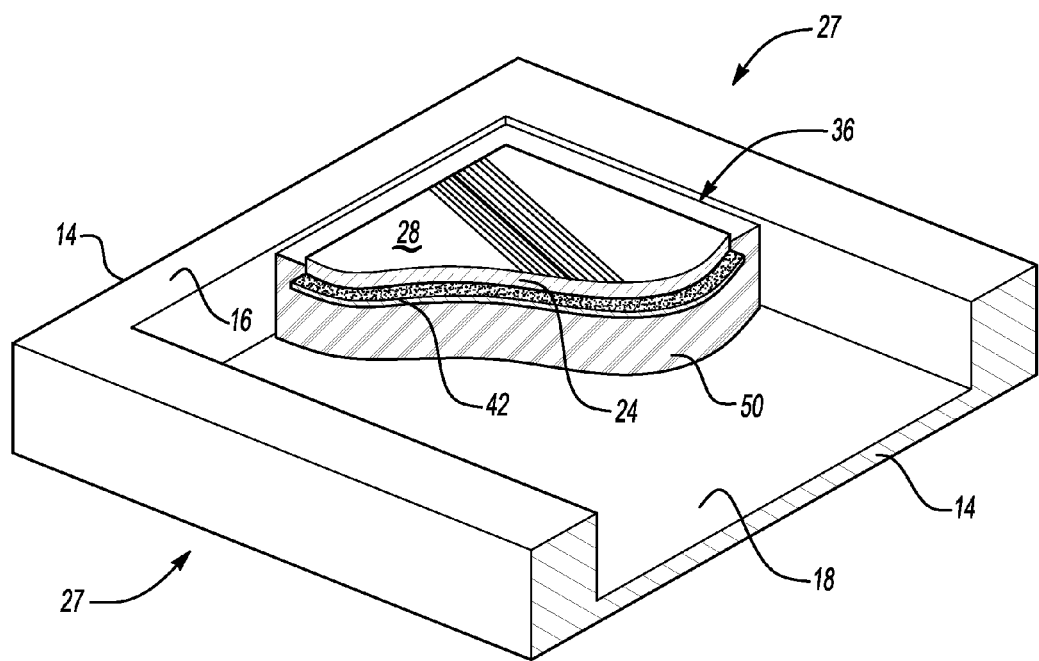
FIG. 7 is a schematic fragmentary perspective planar view of a corner configuration of the emblem assembly of FIG. 1.

The molded resin 50 may include a cured pressure-moldable thermoplastic resin having a tensile strength of from about 400 psi to about 500 psi, e.g., about 435 psi when measured in accordance with test method ASTM D638-10. That is, the molded resin 50 may include a resin characterized as "low-pressure moldable". As used herein, the terminology "low-pressure moldable" refers to a resin that is injection moldable at a pressure of from about 75 psi to about 175 psi. For example, the molded resin 50 may be suitable for use in a low-pressure molding apparatus (shown generally at 60 in FIG. 6). The molded resin 50 when cured has a Shore A hardness of about 80. Further, the molded resin 50 may have an elongation at break of at least 500% when measured in accordance with test method ASTM D-3759. That is, the molded resin 50 may stretch within the channel 36. Therefore, as best shown in FIG. 1, the fourth surface 28 may be substantially flush with the first surface 16. That is, the second element 24 may not protrude from the first element 14, but rather the fourth surface 28 of the second element 24 may be coplanar with the first surface 16 of the first element 14. Further, as shown in FIG. 7, the second element 24 may be disposed within a periphery 27 of the first element 14.

The molded resin 50 may be polyamide-based, polyester-based, polyolefin-based, or polyimide-based. The molded resin 50 may also include additives such as, but not limited to, flow aids, colorants, catalysts, cross-linking agents, tackifying resins, waxes, plasticizers, stabilizers, flame retardants, fillers, and combinations thereof A specific example of a suitable molded resin 50 is Bostik® LPM 915, commercially available from Lighthouse Molding, Inc. of Sterling Heights, Mich.

Referring now to FIG. 5, the emblem assembly 10 may further include an adhesive 56 sandwiched between and disposed in contact with each of the molded resin 50 and the second surface 18 to thereby bond the second element 24 to the first element 14. That is, the adhesive 56 may adhere the molded resin 50 to the second surface 18 so that the second element 24 is attached to the first element 14. The adhesive 56 may also be impermeable to environmental contaminants, e.g., dirt, rain, snow, and cleaning agents encountered during operation of the vehicle 12. The adhesive 56 may have a thickness 58 (FIG. 5) of from about 0.2 mm to about 0.8 mm. For example, the adhesive 56 may be a positionable tape and may have a thickness 58 of about 0.3 mm so as to contact each of the second surface 18 and the molded resin 50 within the channel 36. That is, the adhesive 56 may be positioned, and re-positioned if necessary, to contact at least a portion of, for example, the molded resin 50. Further, the adhesive 56 may exhibit compressibility and may have an elongation at break of at least 100% when measured in accordance with test method ASTM D-3759. That is, the adhesive 56 may stretch and compress within the channel 36 so that the second element 24 does not protrude from the first element 14.

The adhesive 56 may include acrylic and foam and may have a flexible core. For example, the adhesive 56 may include a viscoelastic foam core and acrylic adhesive, and may be double-sided. That is, the acrylic adhesive may be disposed on two opposing surfaces of the viscoelastic foam core. A specific example of a suitable adhesive 56 is 3M™ Acrylic Foam Tape 5344, commercially available from 3M of St. Paul, Minn.

Therefore, in the variation described with reference to FIG. 5, the emblem assembly 10 includes the first element 14, the transparent second element 24, the coating 42 disposed on the third surface 26, wherein the coating 42 includes vacuum metalized aluminum and is substantially free from degradation, the molded resin 50 disposed adjacent and in fixed contact with each of the fifth surface 34 and the coating 42 so as to contiguously encapsulate the coating 42 and at least a portion of the fifth surface 34 to thereby wrap around the corner 48 and fill at least a portion of the channel 36, and the adhesive 56 sandwiched between and disposed in contact with each of the molded resin 50 and the second surface 18 to thereby bond the second element 24 to the first element 14.

The molded resin 50 provides the emblem assembly 10 with minimized degradation over an operating life of the vehicle 12. For example, the coating 42 is substantially free from corrosion after continued exposure to cleaning solutions and vehicle operating environments. In particular, the molded resin 50 sufficiently seals the channel 36 to prevent ingress of fluids and/or contaminants to thereby minimize contact between such fluids and/or contaminants and the coating 42.

A method of forming the emblem assembly 10 is also disclosed and described with reference to FIGS. 2 and 6. The method includes depositing the coating 42 (FIG. 2) on the second element 24, whereby the coating 42 is disposed on the third surface 26, as best shown in FIG. 2. For example, the coating 42 may be deposited onto the third surface 26 of the second element 24 via vacuum metallization. In particular, the coating 42 may be deposited via a physical vapor deposition process capable of depositing the coating 42 onto the second element 24. As set for the above, the deposited coating 42 may have a thickness 44 (FIG. 2) of from about 0.01 μm to about 0.2 μm. Further, the thickness 44 of the coating 42 may not substantially vary along the third surface 26, and the coating 42 may be disposed along the entire third surface 26, e.g., along any grooves 30 (FIG. 1) and/or voids 32 (FIG. 1) defined by the third surface 26.

With continued reference to FIGS. 2 and 6, the method also includes, after depositing the coating 42 (FIG. 2), forming the molded resin 50 on the second element 24 whereby the molded resin 50 is disposed adjacent and in fixed contact with each of the fifth surface 34 and the coating 42 so as to contiguously encapsulate the coating 42 and at least a portion of the fifth surface 34, as set forth above. That is, the molded resin 50 may envelop the coating 42 and the fifth surface 34. More specifically, forming may include curing the molded resin 50 on the second element 24 at a pressure of from about 75 psi to about 175 psi. That is, the molded resin 50 may be low-pressure molded onto the coating 42 and at least a portion of the fifth surface 34 of the second element 24. As set forth above, forming may include disposing the molded resin 50 on an entire length of the fifth surface 34, as shown in FIG. 4, or may include disposing the molded resin 50 on only a portion of the fifth surface 34, as shown in FIG. 3.

Forming may include curing the molded resin 50 in any suitable device or system, such as a low-pressure injection molding apparatus shown generally at 60 in FIG. 6. In general, referring to FIG. 6, forming may include inserting the second element 24, including the coating 42 deposited thereon, into the low-pressure injection molding apparatus 60 for contact with a resin feedstock (not shown). More specifically, the second element 24 may be disposed within a cavity of a mold (not shown), and the resin feedstock may be injected into the cavity. The pressure of the cavity, i.e., the "low-pressure" of the low-pressure injection molding apparatus 60, is maintained at from about 75 psi to about 175 psi to thereby cure the molded resin 50 in fixed contact with each of the coating 42 and at least a portion of the fifth surface 34. A cycle time for forming the molded resin 50 on the second element 24 may range from about 5 seconds to about 15 seconds, e.g., about 10 seconds. As such, forming the molded resin 50 is economical and does not detrimentally increase manufacturing cycle times for the emblem assembly 10 and/or the vehicle 12. Curing the molded resin 50 in the low-pressure injection molding apparatus 60 also does not detrimentally affect heat-sensitive resin feedstocks.

Referring again to FIG. 6, after forming the molded resin 50 on the second element 24, the method further includes bonding the molded resin 50 to the first element 14 to thereby form the emblem assembly 10 (FIGS. 1, 4, and 5). That is, the molded resin 50 may be attached to the first element 14. More specifically, bonding may include adhering the molded resin 50 to the first element 14. For example, adhering may include sandwiching the adhesive 56 (FIG. 5) between each of the molded resin 50 and the second surface 18 to thereby attach the second element 24 to the first element 14.

Alternatively, bonding may include inserting the second element 24 into the first element 14, e.g., in the direction of arrow 62 in FIG. 6, whereby the molded resin 50 contacts the second surface 18 to thereby form the emblem assembly 10 (FIGS. 1, 4, and 5). For example, the second element 24 including the molded resin 50 disposed on the coating 42 may be press fit into the cavity 20 (FIG. 6) defined by the second surface 18 of the first element 14 so that the interaction of the first element 14 and the second element 24 compresses the molded resin 50 therebetween.

Therefore, inserting may include filling at least a portion of the channel 36 (FIGS. 1, 4, and 5) with the molded resin 50. That is, referring to FIG. 3, upon inserting the second element 24 into the first element 14, the molded resin 50 may contact the second surface 18 and extend from the second surface 18 into the channel 36 to thereby attach, e.g., adhere, the second element 24 to the first element 14. Consequently, inserting may include sealing the channel 36, and therefore each of the coating 42 and the fifth surface 34, from environmental contaminants to prevent ingress of contaminants and/or fluids into the channel 36. Therefore, bonding the molded resin 50 to the first element 14 minimizes fluid and/or contaminant contact with each of the coating 42 and the fifth surface 34. As such, the method allows for economical and efficient formation of the emblem assembly 10, and the emblem assembly 10 contributes to an increased perceived quality of the vehicle 12.

While the best modes for carrying out the disclosure have been described in detail, those familiar with the art to which this disclosure relates will recognize various alternative designs and embodiments for practicing the disclosure within the scope of the appended claims.

The invention claimed is:

1. An emblem assembly configured for attachment to a vehicle, the emblem assembly comprising:
 a first element configured for attachment to the vehicle and having a first surface and a second surface recessed from said first surface, wherein said second surface is substantially U-shaped;
 a second element configured for attachment to said first element and having;
  a third surface;
  a fourth surface spaced apart from said first surface, said second surface, and said third surface; and
  a fifth surface extending between said third surface and said fourth surface;
  wherein said fifth surface does not abut said second surface, and is spaced apart from said second surface along an entirety of said fifth surface to thereby define a channel between said first element and said second element;
 a coating disposed on said third surface; and
 a molded resin disposed adjacent and in fixed contact with each of said fifth surface and said coating so as to contiguously encapsulate said coating and at least a portion of said fifth surface, wherein said molded resin is a cured pressure-moldable thermoplastic resin that is bondable to said first element.

2. The emblem assembly of claim 1, wherein said coating is substantially free from corrosion.

3. The emblem assembly of claim 1, wherein said molded resin is injection moldable at a pressure of from about 75 psi to about 175 psi and has a tensile strength of from about 400 psi to about 500 psi.

4. The emblem assembly of claim 1, wherein said molded resin has a thickness of from about 0.2 mm to about 0.8 mm.

5. The emblem assembly of claim 1, wherein said fifth surface is spaced apart from said second surface to define said channel therebetween.

6. The emblem assembly of claim 5, wherein said molded resin substantially fills said channel.

7. The emblem assembly of claim 6, wherein said fourth surface is substantially flush with said first surface.

8. The emblem assembly of claim 6, wherein said molded resin has an edge that is substantially flush with said fourth surface.

9. The emblem assembly of claim 1, wherein said molded resin adheres said second surface to said coating.

10. The emblem assembly of claim 1, wherein said coating includes aluminum.

11. The emblem assembly of claim 1, further comprising an adhesive sandwiched between and disposed in contact with said molded resin and said second surface to thereby bond said second element to said first element.

12. The emblem assembly of claim 1, wherein said fifth surface and at least one of said third surface and said fourth surface defines an angle therebetween of less than 90°.

13. The emblem assembly of claim 1, wherein said second surface is substantially U-shaped.

14. An emblem assembly configured for attachment to a vehicle, the emblem assembly comprising:
 a first element configured for attachment to the vehicle and having a first surface and a second surface recessed from said first surface, wherein said second surface is substantially U-shaped;
 a transparent second element configured for attachment to said first element and having;
  a third surface;
  a fourth surface spaced apart from said first surface, said second surface, and said third surface; and
  a fifth surface extending between said third surface and said fourth surface, wherein said fifth surface abuts said third surface to form a corner and wherein said fifth surface is spaced apart from said second surface to define a channel therebetween;

wherein said fifth surface does not abut said second surface, and is spaced apart from said second surface along an entirety of said fifth surface to thereby define a channel between said first element and said second element;

a coating disposed on said third surface, wherein said coating includes vacuum metalized aluminum and is substantially free from corrosion;

a molded resin disposed adjacent and in fixed contact with each of said fifth surface and said coating so as to contiguously encapsulate said coating and at least a portion of said fifth surface to thereby wrap around said corner and fill at least a portion of said channel, wherein said molded resin is a cured pressure-moldable thermoplastic resin that is injection moldable at a pressure of from about 75 psi to about 175 psi; and an adhesive sandwiched between and disposed in contact with each of said molded resin and said second surface to thereby bond said second element to said first element.

15. The emblem assembly of claim 14, wherein said adhesive is a positionable tape.

16. The emblem assembly of claim 14, wherein said coating is visible through said fourth surface.

17. A method of forming an emblem assembly configured for attachment to a vehicle, the method comprising:

depositing a coating on a second element that is different from a first element configured for attachment to the vehicle;

wherein the first element has a first surface and a second surface that is substantially U-shaped and recessed from said first surface;

wherein the second element has;
a third surface;
a fourth surface spaced apart from the first surface, the second surface, and the third surface; and
a fifth surface extending between the third surface and the fourth surface;
wherein the fifth surface does not abut the second surface, and is spaced apart from the second surface along an entirety of the fifth surface to thereby define a channel between the first element and the second element;

wherein the coating is disposed on the third surface;

after depositing, forming a molded resin on the second element so that the molded resin is disposed adjacent and in fixed contact with each of the fifth surface and the coating so as to contiguously encapsulate the coating and at least a portion of the fifth surface;

after forming, bonding the molded resin to the first element to thereby form the emblem assembly, wherein the molded resin is a cured pressure-moldable thermoplastic resin.

18. The method of claim 17, wherein forming includes curing the molded resin on the second element at a pressure of from about 75 psi to about 175 psi.

19. The method of claim 17, wherein bonding includes adhering the molded resin to the first element.

20. The method of claim 19, wherein adhering includes sandwiching an adhesive between each of the molded resin and the second surface to thereby attach the second element to the first element.

\* \* \* \* \*